(12) United States Patent
Chang et al.

(10) Patent No.: US 8,744,185 B2
(45) Date of Patent: Jun. 3, 2014

(54) EFFICIENT MCMC SAMPLING WITH IMPLICIT SHAPE REPRESENTATIONS

(75) Inventors: Jason Chang, Cambridge, MA (US); John William Fisher, III, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 123 days.

(21) Appl. No.: 13/448,581

(22) Filed: Apr. 17, 2012

(65) Prior Publication Data

US 2012/0321186 A1    Dec. 20, 2012

Related U.S. Application Data

(60) Provisional application No. 61/499,154, filed on Jun. 20, 2011, provisional application No. 61/594,013, filed on Feb. 2, 2012.

(51) Int. Cl.
*G06K 9/34* (2006.01)

(52) U.S. Cl.
USPC ...................................................... 382/173

(58) Field of Classification Search
CPC ....... G06K 9/34; G06K 9/4638; G06K 9/469; G06K 9/48; G06K 9/6207; G06K 9/6224; G06T 7/0081; G06T 7/0083; G06T 7/0087; G06T 7/0089; G06T 7/0093; G06T 2207/20044; G06T 2207/20101; G06T 2207/20116; G06T 2207/20161
USPC ......... 382/128, 131, 154, 170, 171, 173, 202, 382/224; 378/4, 8
See application file for complete search history.

(56) References Cited

U.S. PATENT DOCUMENTS

| | | | | |
|---|---|---|---|---|
| 6,018,499 | A * | 1/2000 | Sethian et al. | 367/72 |
| 6,031,935 | A * | 2/2000 | Kimmel | 382/173 |
| 6,324,478 | B1 * | 11/2001 | Popovici et al. | 702/18 |
| 7,715,626 | B2 * | 5/2010 | Florin et al. | 382/173 |
| 7,995,810 | B2 * | 8/2011 | Li et al. | 382/128 |
| 8,280,136 | B2 * | 10/2012 | Gotardo et al. | 382/131 |
| 8,358,819 | B2 * | 1/2013 | Wu et al. | 382/128 |

OTHER PUBLICATIONS

Suvonvorn, N., et al., "Fast Reliable Level-Lines Segments Extraction", Proceeding 2004 International Conference on Information and Communication Technologies From Theory to Application, pp. 349-350, Apr. 19, 2004.*

(Continued)

*Primary Examiner* — Jose Couso
(74) *Attorney, Agent, or Firm* — Occhiuti & Rohlicek LLP (57) ABSTRACT

In an approach for sampling a distribution of segmentations of an image, the segmentations are based on a level set function. For each sample of the distribution, the sampling includes the following, for each of multiple iterations: randomly selecting a set of locations of the level set function, determining a domain of allowed perturbations of the level set function at the selected set of locations, and randomly accepting a perturbation of the level set function according to a criterion corresponding to a biased distribution over the domain of allowed perturbations of the level set function, wherein the bias is selected to increase a probability of accepting the perturbation. The sampling also includes determining the sample of the distribution of segmentations according to a perturbed level set function determined in a final iteration of the multiple iterations for the sample.

22 Claims, 7 Drawing Sheets

(56) References Cited

OTHER PUBLICATIONS

Pen, Huiming, et al. "Integrating Multi-Scale Blob/Curvilinear Detector Techniques And Multi-Level Sets For Automated Segmentation of Stem Cell Images", IEEE International Symposion on Biomedical Imaging: From Nano to Macro, ISBI '09, pp. 1362-1365, Jun. 2009.*

J. Kim, J. W. Fisher, A. Yezzi, M. Cetin, and A. S. Willsky. A Nonparametric Statistical Method for Image Segmentation Using Information Theory and Curve Evolution. IEEE Transactions on Image Processing, vol. 14, No. 10, Oct. 2005.

S Chen and R. J. Radke, "Markov Chain Monte Carlo Shape Sampling Using Level Sets," NORDIA, in Conjunction with IEEE ICCV Workshops, pp. 296-303, 2009.

A. C. Fan, J. W. Fisher III, W. M. Wells, J. J. Levitt, and A. S. Willsky, "MCMC Curve Sampling for Image Segmentation.," MICCAI, vol. 10, No. Pt 2, pp. 477-485, 2007.

S. Geman and D. Geman. Stochastic Relaxation, Gibbs Distributions, and the Bayesian Restoration of Images. IEEE Trans. on PAMI, (6):721-741, Nov. 1984.

W. K. Hastings. Monte Carlo Sampling Methods Using Markov Chains and Their Applications. *Biometrika*, vol. 57, No. 1. pp. 97-109. Apr. 1970.

R. Malladi, J. A. Sethian and B. C. Vemuri. Shape Modeling with Front Propagation: A Level Set Approach. IEEE Transactions on Pattern Analysis and Machine Intellidence, vol. 17. No. 2. Feb. 1995.

Han, C. Xu, and J. L. Prince. A Topology Preserving Level Set Method for Geometric Deformable Models. IEEE Transaction on Pattern Analysis and Machine Intelligence, vol. 25, No. 6, Jun. 2003.

F. Ségonne, "Active Contours Under Topology Control—Genus Preserving Level Sets," Int. J. Comput. Vision, vol. 79, pp. 107-117, Aug. 2008.

\* cited by examiner

FIG. 1

| Description | Energy ($E(\varphi)$) | Gradient Velocity at Pixel $i$ ($v_i$), $R_i^{\pm} = \frac{p_X^{\pm}(x_i)}{p_X^{\mp}(x_i)}$ |
|---|---|---|
| Mutual Information | $-|\Omega| I(X; L) + \alpha \oint_C dl$ | $\log R_i^{\pm} - \alpha \kappa_i$ |
| J Divergence | $-|\Omega| J(p_X^+; p_X^-) + \alpha \oint_C dl$ | $\frac{1}{|T^+|}[\log R_i^+ - D(p_X^+ \| p_X^-) - R_i^- + 1] -$ $\frac{1}{|T^-|}[\log R_i^- - D(p_X^- \| p_X^+) - R_i^+ + 1] - \alpha \kappa_i$ |
| Bhattacharya Distance | $-|\Omega| \int_X \sqrt{p_X^+(x) p_X^-(x)} dx + \alpha \oint_C dl$ | $\frac{1}{2|T^-|} \sqrt{R_i^+} - \frac{1}{2|T^+|} \sqrt{R_i^-} - \alpha \kappa_i$ |

EFFICIENT MCMC SAMPLING WITH IMPLICIT SHAPE REPRESENTATIONS

CROSS-REFERENCE TO RELATED APPLICATIONS

This application claims priority to U.S. Provisional Application No. 61/499,154, filed on Jun. 20, 2011, and U.S. Provisional Application No. 61/594,013, filed on Feb. 2, 2012, each of which is incorporated herein by reference.

STATEMENT OF GOVERNMENT SUPPORT

This invention was made with government support under Grant No. FA9550-06-1-0324 awarded by the Air Force Office of Scientific Research and under Grant No. FA8650-07-D-1220 awarded by the Air Force Electronic Systems Command. The government has certain rights in this invention.

BACKGROUND

Segmentation can be performed on a two (or greater) dimensional image to determine one or more curves that define different segments of the image. Each (possibly non-contiguous) segment can be associated with a unique label that identifies pixels belonging to that segment. For some applications, it is useful to define a space of segmentations, where each segmentation corresponds to a different group of labeled segments of the original image. For example, a probability distribution called a "segmentation distribution" may define probabilities for each of different segmentations in the space. Aspects of a desired segmentation distribution may be unknown, such as its log partition function (which is the logarithm of its normalization factor). In some cases it is possible to evaluate a particular probability value for a particular sample in a distribution, but not to generate samples of that distribution. Various techniques can be used to generate samples from the distribution. As more samples are generated, the samples converge to the desired distribution, and can be used to perform various types of calculations, including for example calculations for Bayesian inference tasks.

For many Bayesian inference tasks, evaluating marginal event probabilities may be more robust than computing point estimates (e.g. the maximum a posteriori (MAP) estimate). Image segmentation, particularly when the signal-to-noise ratio (SNR) of the image is low, is one such task. However, because the space of segmentations is infinitely large, direct inference or sampling is often difficult, if not infeasible. In these cases, Markov chain Monte Carlo (MCMC) sampling approaches can be used to compute empirical estimates of marginal probabilities based on generated samples of a segmentation distribution. For example, different samples are generated by proposing a change to a segmentation that corresponds to a previously generated sample, and then determining, with some probability, whether or not to accept the proposed change for generating a new sample.

However, conventional MCMC approaches applied to segmentation problems can suffer from slow convergence to and/or sampling of the desired segmentation distribution, thereby limiting their usefulness in practical applications. For instance, this is generally the case in application of the Metropolis-Hastings MCMC sampling procedure. One interpretation of the factor in such slow behavior is that in a Metropolis-Hastings iteration (i.e., for each proposed change of segmentation) the probability of accepting the change (equal to the Hastings Ratio) can be relatively small (and may even decrease as the segmentation reaches an accurate estimate), thereby causing most proposals to be discarded.

SUMMARY

In one general aspect, an approach to increasing convergence and/or sampling rate for a MCMC segmentation sampling approach increases the probability of accepting proposed changes to a segmentation, thereby increasing the rate of convergence to the desired distribution. In some implementations of the approach to increasing this probability, the probability is biased towards accepting the proposed changes according to a gradient of an energy function, as described in more detail below. In some implementations, the proposed changes to the segmentation are deterministically accepted at each iteration, thereby further improving the rate of convergence. This acceptance of each proposal maintains the detailed balance constraint upon which the Metropolis Hastings approach is based, but does not have the inherent inefficiency of rejecting proposed changes to the segmentation.

In another aspect, in general, an approach to sampling a distribution of segmentations of a two (or greater) dimensional image makes use of an implicit shape representation defined by a level set function. Generating each of a series of samples from the distribution (in respective iterations) involves randomly selecting a domain of possible perturbations of the level set function. The domain exhibits partition into ranges such that all perturbations within a single range induce the same segmentation of the image. A range is selected at random. The distribution from which the range is selected is determined to guarantee that the perturbation is accepted. This determination of the distribution of ranges from which the range is selected (i.e., the selected range corresponding to a particular segmentation) is such that the acceptance can be interpreted to guarantee that the Hastings Ratio is at least unity. Somewhat equivalently, the determined distribution of ranges is such that random selection of a range maintains the detailed balance required to sample the segmentation distribution. Having selected a range at random, a particular perturbation of the level set function within that range of the domain is selected at random, for instance, from a fixed or uniform distribution.

Aspects can include one or more of the following features.

The domain of possible perturbations comprises perturbations of the level set function at pixels within a mask of the image. In some examples, the mask is a round mask. In some examples, the extent of the mask is randomly selected at one or more iterations.

The domain of perturbations comprises uniform additive perturbations of the level set function within the mask.

The domain of perturbations is parameterized by one or more parameters, and each range of perturbations is associated with a corresponding range of the one or more parameters. For example, in the case of uniform additive perturbations, a single parameter characterizes the amount of the perturbation. Other non-uniform additive perturbations (e.g., spatially smooth functions) can be used.

The boundaries of the ranges within the domain of perturbations are determined according to pixel values of the image within the mask associated with the domain. For instance, a transition from one range to another range corresponds to at least one pixel value changing its segmentation label.

Determined distribution of ranges involves determining for each range in the domain a quantity that depends on a probability of the segmentation induced by the perturbation of the level set function by a perturbation in that range.

In some examples, the approach is applied to M-ary classification in segmentation of a 2 (or more) dimensional image makes use of multiple functions (e.g., multiple level set functions) to define the labeling of multiple respective segments in the image, and follows the general segmentation approach outlined above.

In some examples, the selection of a range is performed according to topological constrains of the corresponding segmentation. For example, certain ranges are excluded if the corresponding segmentation does not meet a predetermined topological property.

In another aspect, in general, in an approach for sampling a distribution of segmentations of an image, the segmentations are based on a level set function. For each sample of the distribution, the sampling includes the following, for each of multiple iterations: randomly selecting a set of locations of the level set function, determining a domain of allowed perturbations of the level set function at the selected set of locations, and randomly accepting a perturbation of the level set function according to a criterion corresponding to a biased distribution over the domain of allowed perturbations of the level set function, wherein the bias is selected to increase a probability of accepting the perturbation. The sampling also includes determining the sample of the distribution of segmentations according to a perturbed level set function determined in a final iteration of the multiple iterations for the sample.

Aspects can include one or more of the following features.

The sampling further comprises filtering perturbations at the selected set of locations to form the accepted perturbation of the level set function.

The filtering comprises lowpass filtering.

The bias is selected based at least in part on a gradient of a log of a probability density function corresponding to the distribution of segmentations.

The bias is selected so that the probability of accepting the perturbation is unity.

Determining the domain of allowed perturbations and randomly accepting a perturbation further comprises: identifying a plurality of ranges of allowed perturbations within the domain of allowed perturbations, determining a probability distribution over the plurality of ranges, randomly selecting a range from the plurality of ranges according to the determined probability distribution, and perturbing the level set function with a perturbation selected from the selected range.

Each range is associated with a segmentation the image, and the probability distribution over the plurality of ranges is based on probabilities of the segmentations associated with the ranges.

The probability distribution comprises different respective uniform probability levels over each range, and the probability level for a particular range is based on a probability of the segmentation associated with a perturbation in the particular range at the selected set of locations.

The domain of allowed perturbations comprises perturbations of the level set function at pixels within a mask defining a subset of pixels in the image.

For at least some samples of the distribution of segmentations, randomly selecting a set of locations comprises randomly selecting an extent of the mask.

The domain of allowed perturbations comprises different sizes of an additive perturbation of the level set function added to each of the pixels within the mask.

The domain of allowed perturbations is parameterized by one or more parameters, and each range of perturbations is associated with a corresponding range of one or more of the parameters.

Boundaries of the plurality of ranges within the domain of allowed perturbations are determined according to pixel values of pixels within the mask.

The segmentation based on the level set function assigns a segmentation label to each of at least some pixels in the image, and a transition from a first selected range to a second selected range corresponds to at least one pixel value changing its segmentation label.

Determining the probability distribution over the plurality of ranges comprises determining, for each range in the domain, a quantity that depends on a probability of a segmentation induced by perturbation of the level set function by a perturbation in said range.

Each segmentation includes more than two segments into which the image is segmented.

Each of multiple segments is determined based on a different respective level set function, and at least one segment corresponds to pixels not in any of the multiple segments.

Randomly selecting a range comprises randomly selecting a range according to one or more topological constrains of the corresponding segmentation.

The one or more topological constraints include: excluding a range from being selected if the corresponding segmentation does not meet a predetermined topological property.

Each sample of the distribution is determined after multiple iterations of a Markov chain Monte Carlo sampling procedure.

Other features and advantages of the invention are apparent from the following description, and from the claims.

DESCRIPTION

1 Overview

In an approach to sampling a distribution of segmentations of a two (or greater) dimensional image, an implicit shape representation is defined by a level set function. The level set function is a function of higher dimensionality than the image. For example, for a 2-dimensional image, the level set function may represent a 3-dimensional surface whose intersections with a plane (e.g., a plane at a zero level) implicitly define curves outlining shapes in a segmentation of the image. As described in more detail below, the level set function can be perturbed to compute samples of a distribution in a way that is able to accommodate topological changes and that is not limited by certain constraints, for example, the function is not constrained to comprise a signed-distance function (SDF).

In some implementations of the sampling approach, generating each of a series of samples from the distribution includes a nested iteration over a series of nested steps. Each nested step includes selecting a random perturbation of the level set function, and either accepting or rejecting the perturbation according to a random acceptance rule. In some examples, random acceptance rule follows a Markov Chain Monte Carlo (MCMC) approach, and more particularly a Metropolis-Hastings MCMC (MH-MCMC) approach. In some examples, the random perturbation is determined by a selection (e.g., random selection, for example, biased to locations that are likely misclassified) of points (e.g., pixels) in the image, and determining a degree of perturbation at each point as a random draw from a distribution that is biased according to a gradient of an energy function associated with an optimization of the segmentation. In some examples, the inner iteration is allowed to converge between determined samples of the segmentation distribution. In some examples, each inner iteration is begun at a randomly selected starting point. In some examples, proposals at each iteration are accepted with certainty.

An application of this sampling of segmentations includes determination of a location-based probability of that location being on a boundary, or of that location being assigned a particular label (e.g., in a M-ary extension of the approach). Such determined probabilities can provide improved characteristics over direct estimation of such probabilities because of the requirement that quantities are consistent with segmentations rather than being based on local classifications as boundaries.

In some examples, the sequence of segmentations during an inner iteration can exhibit topological changes, and thereby the ultimate sample of the segmentation may have different topological properties than those of the initial segmentation. Topological control can be incorporated into the approach to exploit prior knowledge of the shape topology, as described in more detail below. Using the techniques described herein, both local and global topological constraints on sample shapes can be efficiently incorporated.

Sampling techniques over the space of implicitly defined segmentations facilitate estimation of marginal statistics defined over the segmentation distribution. Some approaches to segmentation are formulated as an energy optimization. For example, a Bayesian inference procedure may express an energy functional E(l; x) that is the log of a probability function according to:

$$p_{L|X}(l|x) \propto \exp[\pm E(l;x)],$$

where x is an observed image, l is the labeling associated with a segmentation of the observed image, and the ± in the exponent depends on whether the energy optimization is based on maximizing or minimizing In partial differential equation (PDE)-based level set methods, the labeling may be, for example, a binary labeling determined as l=sign(ϕ), where co is a level set function. In some examples, the energy functional can be decomposed into a data fidelity term and a regularization of the segmentation. Bayesian formulations treat the former as the data likelihood and the latter as a prior on segmentations:

$$p_{L|X}(l|x) \propto p_{X|L}(x|l) p_L(l).$$

While both the data likelihood and prior terms may be user-defined, the form of the prior may vary considerably depending on the optimization method; a curve-length penalty is typically used in level set methods while a neighborhood affinity is typically used in graph-based methods. These two forms of the energy are referred to as the PDE-based energy and the graph-based energy, respectively.

The MH-MCMC approach can be used to sample from segmentation distribution to evaluate marginal statistics. To enable a computationally tractable sampling approach, energy based, level set formulations may be analyzed within a Bayesian framework. The proposal function that is used for generating proposed MCMC samples has an impact on the length of the mixing time, which quantifies how long it takes to converge to a stationary set of samples from the segmentation distribution. The proposal function generates proposed samples that can be accepted with high probability, or even with certainty, by controlling the perturbations in the level set function and the resulting perturbed level set shapes. Some of the advantages of the techniques described herein include relaxing constraints on the allowed shape class, and providing a proposal function that reduces the mixing time.

Figure 1:
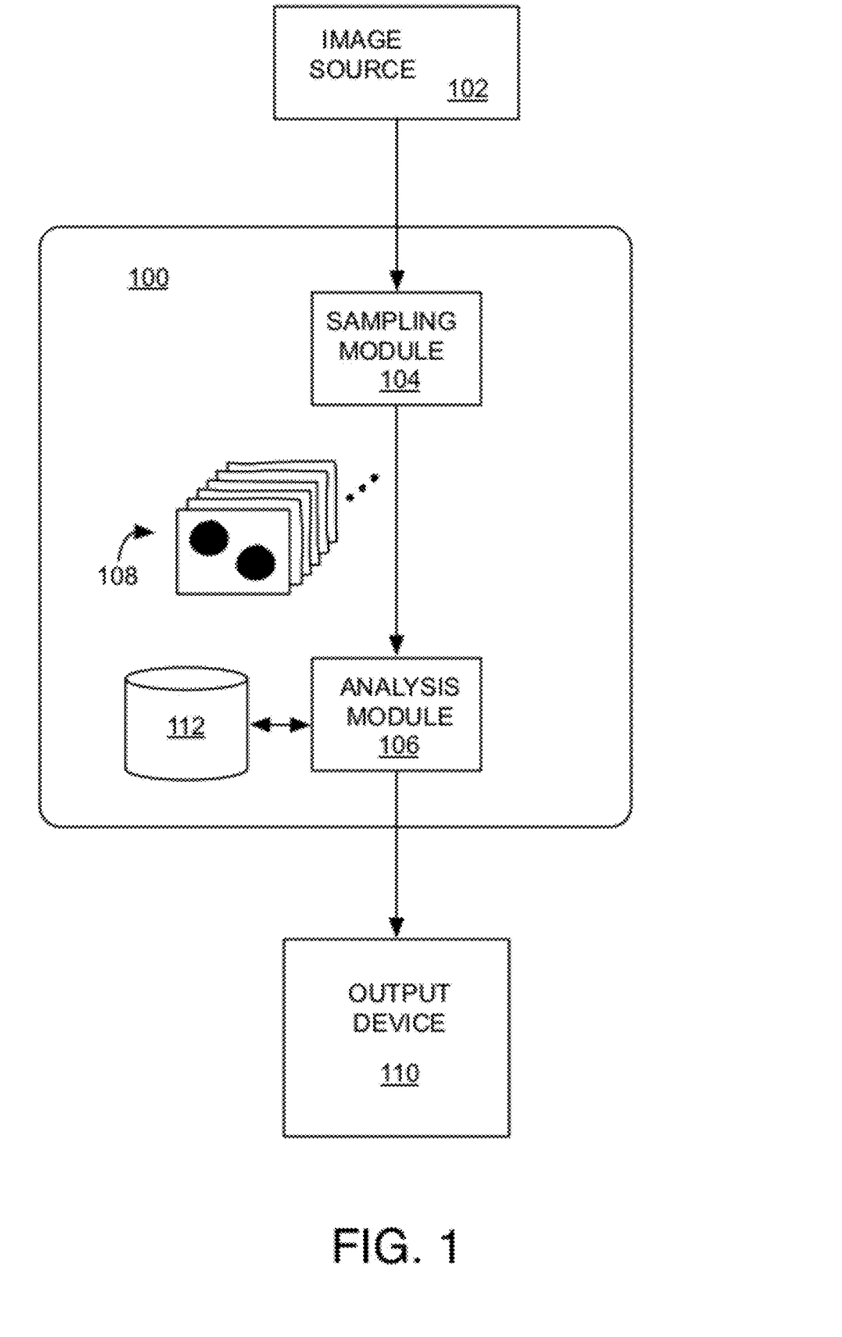
FIG. 1 is a block diagram of a system for processing images.

Some embodiments of a system 100 for processing images include some or all of the components shown in FIG. 1. The system 100 receives image data from acquired images or portions of acquired images provided by an image source 102. For example, the image source 102 can include an image acquisition component such as a medical imaging device (e.g., a computed tomography (CT) scanner), or a remote sensing imaging device (e.g., a satellite imaging system). The imaging source 102 can include a data storage system, such as a database system or server, that stores images or image data to be provided to the system 100.

The system 100 includes a sampling module 104, and an analysis module 106. The sampling module 104 generates a set of samples 108 of a segmentation distribution, for example, as a set of segmented images. The analysis module 106 receives the samples 108 and generates information that represents marginal statistics or other aggregations (averages, or probabilistic expectations, etc.) computed based on the samples 108. The modules 104 and 106 may be implemented together in the same computing system, or in different respective computing systems in communication with each other (e.g., over a network). The results generated by the system 100 can be provided to an output device 110 such as an image presentation system (e.g., a computer monitor), and can be temporarily stored in a data storage system 112 for later presentation or additional processing. The output device 110 can present information (e.g., as images or numerical quantities) used for decision-making or diagnosis, for example. The data storage system 112 may also be in communication the sampling module 104 or integrated together in the same computing system as either or both modules.

2 Metropolis-Hastings MCMC Sampling

The following is an example of a framework that can be used for the MH-MCMC approach. For notational convenience, the dependence on the image x in the expressions of the distributions is dropped, and the desired target distribution that is to be sampled is denoted as the posterior distribution $p_{L|X}(l)$. MCMC methods are applicable when one can compute a value proportional to the target distribution, but not sample from it directly. Distributions defined over the infinite-dimensional space of segmentations fall into this category. MCMC methods address this problem by constructing a first-order Markov chain such that the stationary distribution of that chain is the target distribution. For this condition to hold, it is sufficient to show that the chain is ergodic and satisfies a "detailed balance" condition. The MH-MCMC approach of this example satisfies these conditions.

In this example, $\hat{\phi}^{(t)}$ is a proposed value of a level set function (which implicitly represents a segmentation) at iteration time t, generated from a proposal function expressed as a "proposal distribution" $q(\hat{\phi}^{(t)}|\phi^{(t-1)})$ conditioned on the previous iteration $\phi^{(t-1)}$. The superscript values (t−1) and (t) index the Markov chain iterations and the hat indicates a proposed value. The actual next iteration $\phi^{(t)}$ is then determined, according to the following transition rule, to be either:
$\hat{\phi}^{(t)}$ with probability min($\alpha^{(t)}$,1), or else
$\phi^{(t-1)}$ with probability 1−min($\alpha^{(t)}$,1)
where the Hastings ratio, $\alpha^{(t)}$, is defined to be:

$$\alpha^{(t)} = \frac{p_{L|X}(\hat{l}^{(t)})}{p_{L|X}(l^{(t-1)})} \frac{q(\varphi^{(t-1)}|\hat{\varphi}^{(t)})}{q(\hat{\varphi}^{(t)}|\varphi^{(t-1)})},$$

and where the segmentation labels are $\hat{l}^{(t)}=\text{sign}(\hat{\phi}^{(t)})$ and $l^{(t-1)}=\text{sign}(\phi^{(t-1)})$. A single sample from the target distribution is then generated by repeating these actions of generating a proposed value for the next iteration and then determining the actual value of the next iteration according to the transition rule above until the Markov chain converges (i.e., after the mixing time).

To evaluate the product of the two ratios that make up the Hastings ratio $\alpha^{(t)}$ (the posterior sample ratio (PSR) and the forward-backward ratio (FBR)), a correspondence problem is solved to compute the probability of generating the forward and reverse transition (in the FBR). Doing so satisfies the condition of detailed balance which, in addition to ergodicity, is sufficient for convergence to the desired posterior distribution.

In a level set representation, the magnitude of the level set function $\phi$ including at locations away from the level set curves is chosen. In some approaches, the level set function is constrained in some manner. For example, in one approach the level set function is constrained to be a signed distance function (SDF). The correspondence problem can be solved by generating perturbations that are SDF-preserving, thus having a one-to-one mapping between forward and reverse transitions. An alternative approach is to produce a non-SDF-preserving perturbation and reinitialize the level set function to an SDF at each iteration. However, this creates a many-to-many correspondence problem, which increases the computational complexity of the forward-backward ratio.

Some approaches do not constrain the level set function to be an SDF. For example, an approach described in more detail below provides a level set that is not constrained to satisfy the SDF property, but the approach still benefits from the way implicit representations handle topological changes and re-parameterization. Furthermore, the design and evaluation of a proposal distribution is simplified by allowing for straight-forward evaluation of the Hastings ratio.

3 Strategic Bias in the Proposal Distribution

In general, the closer a sample of the proposal distribution is to a sample of the posterior distribution, for a given segmentation, the closer the Hastings ratio is to unity and the higher the acceptance rate. Consequently, designing proposal distributions that capture essential, application-specific characteristics of the posterior distribution can improve convergence speed (i.e., can achieve a short mixing time) by reducing the number of rejected samples. By relaxing constraints on the level set function (e.g., the SDF constraint), many potential proposal distributions may result in a tractable evaluation of the Hastings ratio. Without care in selection, however, the proposal distributions may have long mixing times. The techniques described herein facilitate selection of a proposal distribution that results in tractable evaluation of the Hastings ratio, has a high acceptance rate, and explores the configuration space via large perturbations.

The PSR portion of the Hastings ratio represents the ratio of the posterior probability of the new sample over that of the previous sample. Generating new samples that have higher posterior probabilities than the previous sample will produce high values of this ratio. The FBR portion of the Hastings ratio represents the probability of generating the previous iteration conditioned on the next iteration (the backward transition) over the probability of generating the next iteration conditioned on the previous iteration (the forward transition). In the following example, a proposal distribution is selected to provide a higher overall Hastings ratio (the product of the PSR and the FBR), where certain deleterious effects on the FBR are compensated by increases in the PSR, based on the concept that neighboring pixels tend to have the same label (indicating they are in the same segment).

An additive perturbation, f, can be made to $\phi^{(t-1)}$ to yield $$\hat{\phi}^{(t)}=\phi^{(t-1)}+f^{(t)},$$

by first sampling from a point process, attributing the points with values sampled from a biased Gaussian distribution and then smoothing with a lowpass filter. This process is referred to as Biased and Filtered Point Sampling (BFPS). The lowpass filter captures the property that pixels in close proximity have higher probability of being in the same segment while the choice of bias favors points with high likelihood under the energy functional. The result is relatively large increases in the PSR values, using large biased moves, with relatively small decreases in the FBR values. This can be expressed as:

$$f^{(t)}=h^{(t)}*(c^{(t)}\circ n^{(t)}),$$

$$n_i^{(t)} \sim N(\mu_i^{(t)},\sigma^2),$$

$$c_i^{(t)} \sim \text{Bernoulli}(p_{c_i}^{(t)}).$$

where '*' denotes convolution and '∘' denotes the element-wise product. The Gaussian random variables are biased with the gradient velocity $v_i^{(t)}$ (the negative gradient of the energy functional) to prefer moving to more probable configurations as follows:

$$\mu_i^{(t)} = \alpha_n\left[-\frac{\partial E(\varphi^{(t)})}{\partial \varphi^{(t)}}\right]_i = \alpha_n v_i^{(t)},$$

where $\alpha_n$ is a weighting parameter. The probability associated with each point, $c_i$, is also selected to favor selecting points that are better explained in another region. For example, it is chosen to be higher for points that have a gradient velocity that is large in magnitude and has the opposite sign of the current level set value:

$$p_{c_i}^{(t)}(1) \propto \alpha_c\exp[-v_i^{(t)}\cdot\text{sign}(\phi_i^{(t)})]+(1-\alpha_c),$$

where $\alpha_c$ is a parameter that trades off the bias with a uniform distribution. Additionally, the variable $\gamma$ is defined as:

$$\frac{1}{|\Omega|}\sum_{i\in\Omega} p_{c_i}^{(t)}(1) = \gamma,$$

which approximates the average probability that a random point will be selected, where $\Omega$ is the set of all pixels. Because $p_{c_i}^{(t)}(1)$ is only defined up to a scale factor, its value can be renormalized to achieve any $\gamma$. In some implementations, $\alpha_n$, $\alpha_c$, and $\gamma$ are dynamically adapted to maintain a minimum acceptance rate, and $h^{(t)}$ is chosen to be a circularly symmetric (truncated) Gaussian kernel with a scale parameter randomly chosen from a finite set of values. Randomly chosen scale parameters can contribute to faster mixing times.

4 Sufficient Conditions for MCMC Sampling

In MCMC sampling approaches, conditions can be determined to ensure convergence to the correct stationary distribution. In some approaches it is sufficient, to satisfy the following conditions: (1) that the Markov chain is ergodic, and (2) that each individual step in the MCMC procedure satisfies a detailed balance condition.

Ergodicity is satisfied if the Markov chain is aperiodic and irreducible. In some cases the Markov chain is unlikely to be periodic because the space of segmentations is so large. In the rare case that the chain is periodic but still irreducible, the average sample path will still converge to the desired segmentation distribution. Irreducibility of a Markov chain implies that any state in the chain has finite probability of reaching any other state in the chain. The example below provides a chain having irreducibility while allowing any topological change in a perturbation of the level set function, and has finite probability of transitioning from any curve to any other curve in a single perturbation. This is evident since c is a Bernoulli process that has finite probability of being one everywhere and n is a Gaussian process that has finite probability of taking on any value.

Detailed balance is satisfied in the following example demonstrating a procedure for calculating the Hastings ratio. In some cases the energy functional that is being sampled depends on the probability density of the observed data conditioned on a segmentation. In such cases, the densities change at every iteration, and are updated using a kernel density estimate. The PSR can be computed as follows:

$$\frac{p_{L|X}(\hat{f}^{(t)})}{p_{L|X}(f^{(t-1)})} = \frac{\exp[-E(\hat{\varphi}^{(t)})]}{\exp[-E(\varphi^{(t-1)})]},$$

The new proposed level set, $\hat{\varphi}^{(t)}$ is only dependent on the previous level set, $\varphi^{(t-1)}$, and the random perturbation, $f^{(t)}$. Thus, the FBR can be written as $$\frac{q(\varphi^{(t-1)} | \hat{\varphi}^{(t)})}{q(\hat{\varphi}^{(t)} | \varphi^{(t-1)})} = \frac{p_F(-f^{(t)} | \hat{\varphi}^{(t)})}{p_F(f^{(t)} | \varphi^{(t-1)})}.$$

For a single lowpass filter, there exists a one-to-one mapping between the forward and backward transitions. In some implementations, multiple filters of different variances are used to speed up the algorithm. A realized perturbation, f, can therefore be generated from multiple combinations of $\{\hat{h}, \hat{c}, \hat{n}\}$. Calculation of the FBR involves the probability of generating f using each of these combinations. The combination $\{h,c,n\}$ without hats represent the actual combination that was used to generate f. The probability of generating the perturbation is dominated by $\{\hat{h},\hat{c},\hat{n}\}=\{h,c,n\}$.

The following relationship holds: $\hat{c} \circ \hat{n} = \hat{h}^{-1} * f$,
where $\hat{h}^{-1}$ is the highpass filter that is the inverse of $\hat{h}$. The probability of generating a perturbation can be expressed as:

$$p_F(f|\varphi) = \sum_{\hat{h}} p_H(\hat{h}) p_C(\hat{c}|\varphi, \hat{h}) p_N(\hat{n}|\varphi, \hat{c})$$

-continued $$= \sum_{\hat{h}} p_H(\hat{h}) p_C(\hat{c}|\varphi, \hat{h}) \prod_{\substack{i \in \Omega \\ \hat{c}_i=1}} \mathcal{N}(\hat{n}_i; \mu_i(\varphi), \sigma^2).$$

Additionally, $\hat{c}$ is a set of sparse points with an average probability of being nonzero of $\gamma \Box 1$. When $\hat{h} \neq h$, $\hat{c}$ will be nonzero at almost every pixel, which leads to the following inequality:

$$p_C(\hat{c}|\phi, \hat{h} \neq h) \approx \gamma^{|\Omega|} \Box \gamma^{\gamma|\Omega|} \cdot \bar{\gamma}^{\bar{\gamma}|\Omega|} \approx p_c(c|\phi,h),$$

where $\bar{\gamma} \Box 1-\gamma \approx 1$. Since $p_N(\hat{n}|\phi, \hat{c} \neq c) \Box p_N(n|\phi,c)$, the probability of generating the perturbation with a filter $\hat{h} \neq h$ is much less than the probability of generating it with $\hat{h}=h$. Therefore the probability of a particular perturbation can be approximated as $$p_F(f|\varphi) \approx \frac{1}{N_h} p_C(c|\varphi) \prod_{\substack{i \in \Omega \\ c_i=1}} \mathcal{N}(n_i; \mu_i(\varphi), \sigma^2),$$

where $N_h$ is the number of possible filters, a filter is chosen with uniform probability, and $p_c(c|\phi)$ is evaluated as shown above. Combining these equations with the equations for the PSR and the FBR enables an efficient calculation of the Hastings ratio, ensuring detailed balance.

5 M-ary Sampling

The binary segmentation sampling approach described above (with two labeled segments in each segmentation) can be extended to an M-ary sampling approach with more than two labeled segments in each segmentation. In one example, there are M+1 regions into which the pixels of an image are to be segmented. M level set functions are selected to represent the M+1 regions. Each of M regions, $R_1, \ldots, R_M$ contains the positive values of its respective level set function. One of the regions (called the null region), $R_0$, contains those pixels that are not contained by any of the other regions $R_1, \ldots, R_M$. The following are the definitions of the M+1 regions:

$$R_0 = \bigcap_{\ell \in \mathcal{L}} \{i | \varphi_\ell(i) < 0\}$$

$$R_l = \{i | \phi_l(i) \geq 0\}, \forall l \in L = \{1, 2, \ldots, M\}$$

In this M-ary segmentation, level set functions are selected such that neither a "vacuum condition" (a pixel belongs to no region) nor an "overlap condition" (a pixel belongs to multiple regions) are able to occur. Due to the way that the null region Is defined, vacuum conditions do not occur; however, without additional constraints, an overlap condition may occur among the regions $R_1, R_2, \ldots, R_M$. Rules can be used for perturbations of the level set function, similar to the binary case, that preclude both of these conditions.

For example, at each iteration, one of the level sets, $\phi_l$, is randomly selected. Each pixel, i, in this level set can be categorized into one, and only one, of the following three types: (1) the pixel belongs to $R_l$, (2) the pixel belongs to $R_0$, or (3) the pixel belongs to $\{R_l | l \in L, l \notin \{1,0\}\}$. A perturbation of the level set function involves changing the level set function to move certain pixels from one region to another. By only allowing transitions between pixels of type 1 and type 2 for a proposed perturbation, an overlap condition cannot occur.

The proposed perturbation is then of the same form as for the binary case above:

$$\hat{\phi}_l^{(t)} = \phi_l^{(t-1)} + f_l^{(t)}$$

The new $f_l^{(t)}$ is drawn from the following $$f_l^{(t)} = (h^{(t)} * (c_l^{(t)} \circ n_l^{(t)})) \circ \text{II}_{\{R_l \cup R_0\}},$$

where $\text{II}_{\{\cdot\}}$ is the indicator function, and is included to ensure only pixels of type 1 and 2 are affected. This restriction, along with the modified proposal distribution described subsequently, can be implemented with essentially no penalty. In very specific instances, it can lead to large convergence times, but these situations can be precluded with a proposal that randomly selects the null region.

To ensure a good proposal distribution, the Bernoulli process, c, and the mean of the Gaussian random variables, $\mu_i$, can be altered. The label (l) is the label of the level set that is currently being perturbed and (l) is the label of another level set (i.e., $l \neq \{0,l\}$). In the binary case, only one gradient velocity $v_i^{(t)}$ existed because there was only one level set. With multiple level sets, the quantity v(l,l) represents the gradient velocity between regions $R_l$ and $R_{l'}$. In the M-ary example presented above, only v(l,0) is considered because only moves to and from $R_0$ are allowed. However, the null region, $R_0$, acts as a temporary region for pixels switching between other regions. More specifically, if a pixel in the level set that is currently being perturbed, $\phi_l$, would be better described in $R_{l'}$, then the perturbation can move the pixel to the null region so it can ultimately move to region $R_{l'}$. This observation is reflected in the proposal distribution by replacing the true gradient velocity $v_i^{(t)}$ in the equations above with the following minimal gradient velocity, m(l), at pixel i:

$$m_i(l) = \min_{l' \in \{0,1,2,\ldots,M\}, l' \neq l} v_i(l', l).$$

This minimal gradient velocity essentially trades off the current region label with the other most likely label. When M=1, this formulation reduces to the binary case.

The BFPS approach can be applied to sampling schemes that use any of a variety of energy functionals over implicit representations. Such an application is predicated on the evaluation of the gradient of the energy functional. The following are examples of a few energy functionals and features that may be incorporated into the approach along with a description of some marginal statistics of interest. For example, BFPS facilitates evaluation of region-based methods in edge-detection tasks.

Figure 2:
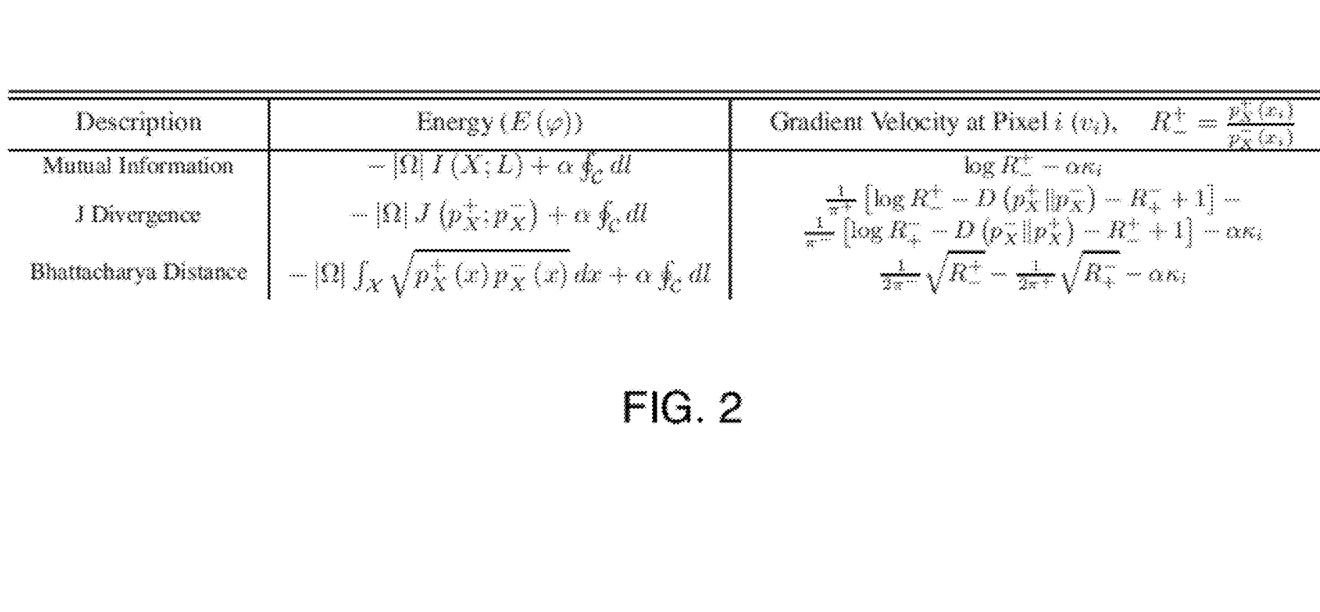
FIG. 2 is a table with examples of energy functionals.

FIG. 2 shows a table with three information-theoretic energy functionals and their corresponding gradients. Here, X represents the image feature, and $p_X^\pm$ represents the densities of the feature in the $R^\pm$ region. These energy functionals can be used within BFPS by replacing the energy functional $E(\phi^{(t)})$ in the equations above, and the gradient velocities $v_i^{(t)}$ in the equations above. In each case, a curve length penalty may be used for regularization.

Samples of a segmentation distribution generated using the BFPS approach can be used to evaluate marginal statistics. Marginal statistics can be evaluated over samples of the segmentation distribution using any of a variety of techniques. For example, a histogram image of a segmentation can be computed, where each pixel in the histogram image corresponds to a value resulting from a count of the number of times that pixel was included in a particular segment. Another example of a marginal event probability that can be calculated is the probability that a pixel lies on (or adjacent to) a boundary between segments, referred to as the probability of boundary (PB) image. The PB at pixel i can be calculated by counting the number of samples for which pixel i lies on a boundary and normalizing by the number of samples. This statistic may facilitate evaluation of results compared to a standard dataset (e.g., the Berkeley Segmentation Dataset (BSDS), which compares precision-recall (PR) curves on this same event probability).

6 Proposals Accepted with Certainty

BFPS achieves a high acceptance ratio at each iteration by biasing the proposal (e.g., biasing based on the gradient of the energy functional). In a unity Hastings ratio (UHR) approach, the proposal is biased such that samples are accepted with certainty (i.e., where the Hastings ratio, $\alpha^{(t)}$, evaluates to one at every iteration). Given some previous level set function, $\phi^{(t-1)}$, a proposal, $\hat{\phi}^{(t)}$, can be generated with a procedure that includes the following steps: (1) sample a mask, m, that selects a subset of pixels, and (2) add a randomly selected value, f (which may be positive, or negative, or zero), to the values of all pixels within this mask. An example of such a procedure can be expressed as:

$$\hat{\phi}^{(t)}(m,f) = \phi^{(t-1)} + f \cdot m,$$

where the mask, m, is a set of indicator variables with the same size as $\phi$ that indicate a non-zero region within the support of the mask (where the indicator variables have a value of one) to which the perturbation f is added. No perturbation is added to locations outside of the support of the mask (where the indicator variables have a value of zero). The support of the mask can be of any shape and size, including, for example, circles of random center and radius. Deferring the choice of f, the proposal likelihood can be expressed as:

$$q(\hat{\phi}^{(t)}|\phi^{(t-1)}) = p_M(m) p_{F|X M \Phi}(f|m, \phi^{(t-1)}).$$

Figure 3A:
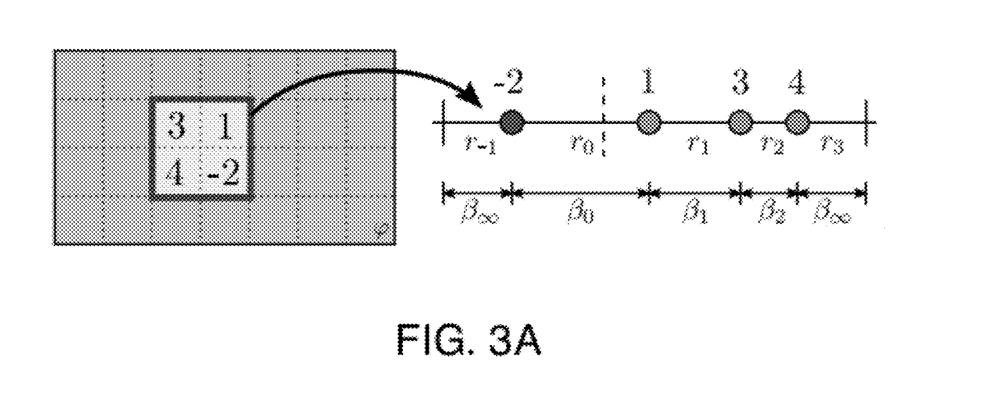
FIG. 3A is a schematic diagram of a mask over a level set function and corresponding ranges for an additive perturbation.

FIG. 3A shows an example of a 2×2-pixel mask overlaid on a level set function $\phi$ with the height of $\phi$ plotted on the real line for pixels in the support of the mask. The value of each pixel is represented as a real number. So, with the assumption that the level set function is not completely flat in the support of the mask, the number of unique pixel values represented is the same as the total number of pixels m in the support of the mask. The dotted line marks the zero-height which splits pixels into a foreground (larger than zero) and a background (less than zero) in this binary label example. All pixels in the support of the mask have the same perturbation value f added to their value, so randomly selecting the additive perturbation f to apply to those pixels is equivalent to shifting the zero-height of the masked region represented by those pixels by $-f$. The resulting proposed zero-height can fall into one of (m+1) different ranges $r_i$, which are separated by the m different pixel values. For any particular range in which the zero-height falls, there is a different combination of perturbed pixel values that are in the foreground and background. The different possible values of the randomly selected range R in which the zero-height falls (for a particular value of the perturbation f) can be represented by the respective integers in $[-n^-, n^+]$, where $n^\pm$ count the pixels in the support of the mask that have height $\phi_{<}^{>} 0$.

Selecting a value of the perturbation f can then be decomposed into selecting a value of the range R, followed by selecting a value within that range for the precise location of the zero-height. However, in many cases the energy functional only depends on the sign of pixels, which is determined by the range R in which the zero-height falls, no matter where within that range the zero-height is precisely located. If the probability distribution for the value of f given a particular range is a uniform distribution $$p_{F|R}(f \mid r) = \frac{1}{\beta_r},$$

then the perturbation likelihood can be expressed as $$p_{FR|XM\Phi}(f \mid m, \varphi^{(t-1)}) = \frac{1}{\beta_r} p_{R|XM\Phi}(r \mid m, \varphi^{(t-1)}),$$

where $\beta_r$ is the width of range r (note that r conditioned on f is deterministic). Because the value of f within a range r does not affect the sign of the resulting level set function, the proposed labeling can be expressed as:

$$\hat{l}^{(t)}(m,r) = \text{sign}(\hat{\phi}^{(t)}(m,f) - p_{F|R}(f|r)).$$

The following is an example of a proposal for the ranges that results in a distribution biased such that the Hastings ratio evalutes to one at each iteration, $$p_{R|XM\Phi}(r|m,\phi^{(t-1)}) \propto \beta_r p_{L|X}(\hat{l}^{(t)}(m,r)).$$

The endpoints for the first and last ranges can be selected so that these two ranges do not extend to ±∞, which would yield corresponding values of β that are also ∞. Both of these ranges can be limited to be of some finite length $\beta_\infty$. For example, the value $\beta_\infty$ can be selected to be 1. The entire extend of non-zero probability space from the left end of the left range to the right end of the right range represents the domain of possible perturbations.

Figure 3B:
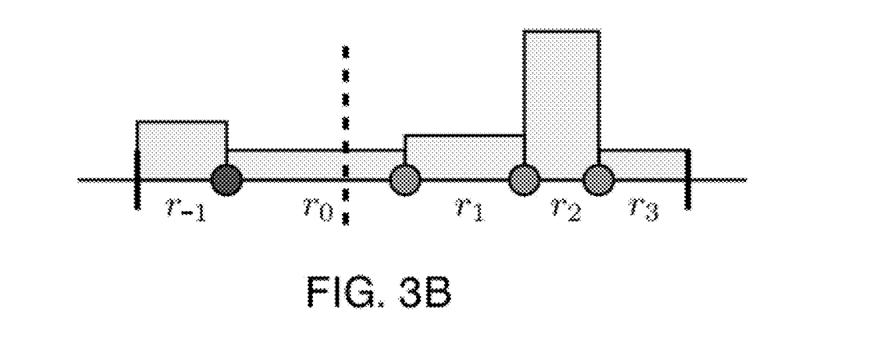
FIGS. 3B and 3C are plots of probability distributions for an additive perturbation.
Figure 3C:
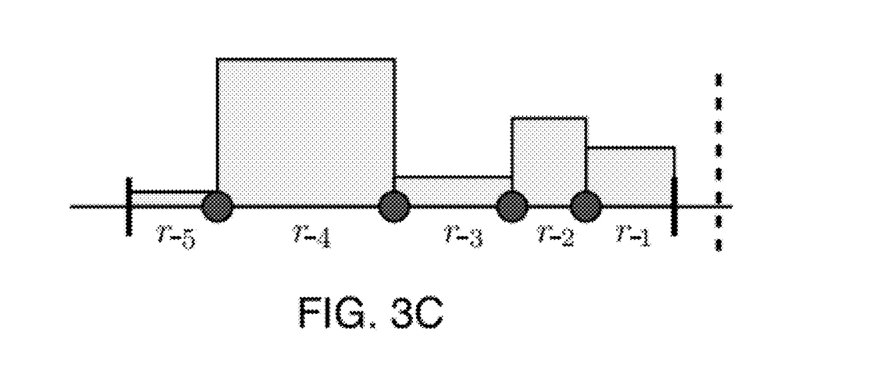

FIGS. 3B and 3C show examples of probability distributions for the additive perturbation f expressed in terms of the new location of the zero-height along the real line after the proposed perturbation is applied. In these examples, some value of $\beta_\infty$ is chosen, and the current zero-height line is marked with the dotted line. These two distributions correspond to two different mask selections. FIG. 3B shows a distribution for what is called a valid mask, in which the current zero-height line falls within the non-zero probability space. FIG. 3C shows a distribution for what is called an invalid mask, in which the current zero-height line falls outside the non-zero probability space. For the invalid mask, a forward perturbation could be proposed such that the resulting proposed zero-height line falls in the non-zero probability space. However, the backward transition to bring the proposed zero-height line back to the current zero-height line would be zero because it lies in the zero-probability space. If $\beta_\infty$ is selected to be a constant C, and all pixels are initialized to have height $|\phi_i| < C$, then every possible (initial) mask will be valid. As the chain progresses, some masks will become invalid, in which case valid masks are sampled. Because any mask that contains both positive and negative pixels is valid, there are always valid masks from which to sample.

An example of a UHR sampling approach for generating a sample, after multiple iterations of the chain converge to the sample, includes the following steps: (1) randomly select a circular mask, m, with a random center and radius; (2) randomly select a range, r, according to $p_{R|XM\Phi}(r|m,\phi^{(t-1)}) \propto \beta_r P_{L|X}(\hat{l}^{(t)}(m,r))$; (3) randomly select a perturbation, f, uniformly in this range; (4) compute $\hat{\phi}^{(t)}(m,f) = \phi^{(t-1)} + f \cdot m$; (5) repeat from Step 1 until convergence of the chain.

When calculating the likelihood of each range in Step 2, only a value proportional to the true likelihood is needed. Normalization can be performed after the calculation of the likelihood because all ranges are enumerated. Equivalently, the energy, which is related to the likelihood via a logarithm, only needs to be calculated up to a constant offset. The change in the energy can be computed by including or excluding the pixels in each range. This can be efficiently computed for all ranges, for example, using two passes. Each pass begins at the range $r_0$, setting this energy to zero and choosing to either go in the positive (first pass) or negative (second pass) direction. Based on $r_{\pm 1}$, the change in energy is computed when the one pixel changes sign. In graph-based energies, if an n-affinity graph is used, only n computations are required at each range evaluation, one for each edge. This procedure can be iterated until all ranges are computed (i.e., up through $r_{\pm n}$).

Unlike graph-based energy functionals, the curve length penalty used in PDE-based energy functionals can be a non-local and relatively expensive computation. In optimization-based segmentation algorithms, the evolution of the level set is based on the gradient of the curve length (i.e., the curvature), which can efficiently be calculated locally. If a sub-pixel-accurate curve length calculation is required, then the energy functional will depend on the value of the perturbation, f, within a particular range, r. As an approximation, a pixel-accurate curve length can be computed by first setting all pixels on the boundary to have height ±0.5, initializing a signed-distance function, and then calculating the curve length via $$\oint dl = \int_\Omega \delta(\varphi_i) |\nabla \varphi_i| d i \approx \sum_i \hat{\delta}(\varphi_i) |\nabla \varphi_i|,$$

and the following discrete approximation to the $\delta(\cdot)$ function $$\hat{\delta}(\varphi_i) = \begin{cases} 1 & |\varphi_i| \leq 1 \\ 0 & \text{else} \end{cases}$$

Figure 4A:
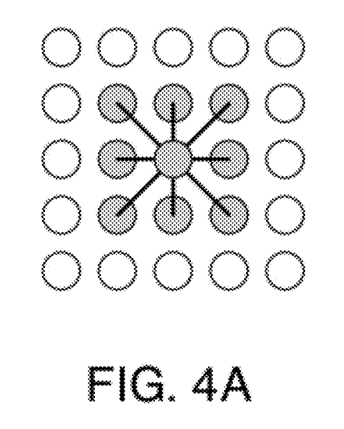
FIGS. 4A and 4B are plots of pixels showing dependence relationships.
Figure 4B:
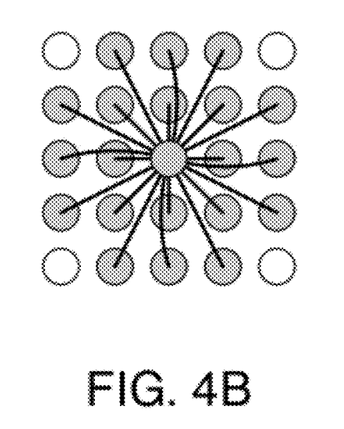

If a first-order accurate signed-distance function is obtained using a fast marching method, the height at a particular pixel depends only on pixels in a 3×3 neighborhood. This dependence relationship is illustrated in the affinity graph of FIG. 4A, where changing the sign of the center gray pixel may affect the value of the signed distance function at each of the surrounding gray pixels. From the equation above for the curve length, the local curve length depends on the magnitude of the gradient of the level set function. If a centered finite-difference is used for the x and y directions, then the local curve length computation depends on neighbors above, below, left, and right. Thus, if the heights are changed for the gray pixels in FIG. 4A the curve length computation changes for all the gray pixels in the affinity graph of FIG. 4B. The change in the curve length for changing the sign of the center pixel is consequently a function of the sign of the 21 gray pixels in FIG. 4B. Different possible combinations (e.g., on the order of $2^{21}$ combinations) can be pre-computed so that the curve length penalty can be efficiently computed by a table lookup.

7 M-ary Sampling

Figure 5:
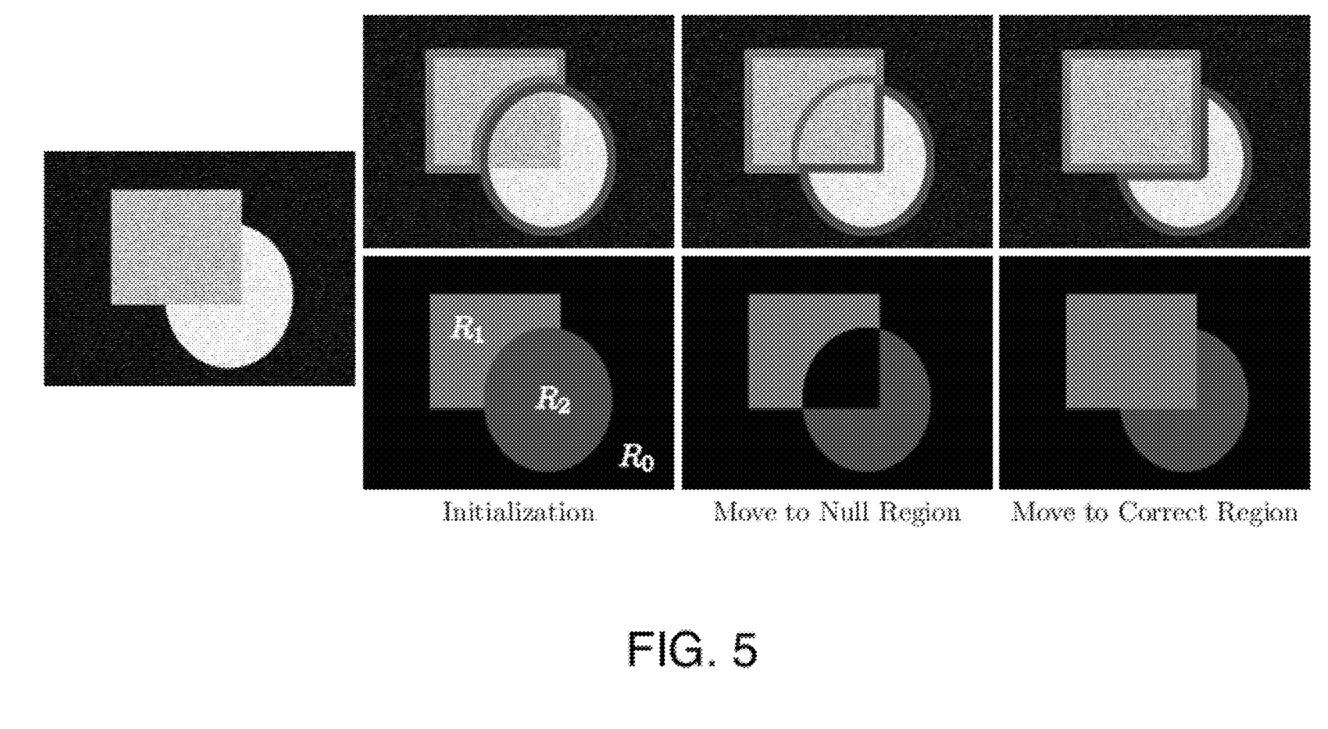
FIG. 5 is a sequence of images of iterations of an M-ary segmentation.

Similar to the BFPS approach, the binary UHR approach can be extended to an M-ary segmentation distribution sampling scheme. The M-ary representation is selected such that vacuum and overlap conditions do not occur. A vacuum condition, where a pixel in the image is not represented within any region, is implicitly restricted by the null region representation. An overlap condition, where a pixel in the image is represented by more than one region, is explicitly enforced by the proposal. As described above, for the BFPS approach, (M−1) level sets and level set functions are used to represent M regions. At each iteration in the proposal, a particular level set function, $\phi_m$, is first selected at random. The additive proposal distribution is modified so that perturbations at each iteration only acts on pixels within $R_m \cup R_0$. With this formulation, a pixel moving from region $R_{m_1}$ to $R_{m_2}$ first temporarily moves to region the null region, $R_0$. This called for alteration of the bias in the proposal; instead of using the gradient velocity, M-ary BFPS uses what is denoted as the minimal gradient velocity. While these two modifications allow sampling of M-ary implicit shapes, they may lead to slower convergence. Additionally, the sampling procedure may converge to local extrema with particular initializations. For example, consider the image and corresponding initialization shown in FIG. 5. This figure illustrates the moves that pixels must make to transition to the correct label. This is accomplished in two steps: (1) pixels that are initially incorrectly grouped with the circle must first transition to the null (background) region, and (2) the pixels must transition from the null region to the correct square region. The potential issue with this lies in the first transition. Because this is an MCMC Metropolis-Hastings procedure, the procedure first accepts the proposal to transition from the circle to the null region. However, because the pixel intensities are more similar to the circle than the background, this proposal is likely to be rejected. The BFPS approach will potentially get stuck in these types of local extrema if multiple restarts are not used.

For the UHR approach, an M level sets and level set functions are used to represent M regions. The following is an example of a representation that ensures no vacuum or overlap conditions without having to greatly alter the proposal distribution. Each pixel i belongs to the region that has the highest height:

$$R_m = \{i | m = \arg\max_l \phi_l(i)\}.$$

This representation ensures that each pixel belongs to one and only one region. The associated proposed perturbation is similar in that a constant is added to a random mask of pixels. However, the ranges and proposal over ranges, according to $p_{R|X M \Phi}(r|m,\phi^{(t-1)}) \propto \beta_r P_{L|X}(\hat{l}^{(t)}(m,r))$, are altered to correctly represent the target distribution.

The difference between to level sets are defined to be $$\Delta_i(\phi_{l_1},\phi_{l_2}) = \phi_{l_1}(i) - \phi_{l_2}(i),$$

and the maximal level set at pixel i is defined to be $$\phi_{max}(i) = \phi_{\arg\max_l \phi_l(i)}.$$

Additionally, the second largest level set at each pixel is defined as $\max^2 \phi_l(i)$. The resulting second maximal level set at pixel i can then be expressed as $$\phi_{max^2}(i) = \phi_{\arg\max^2_l \phi_l(i)}.$$

Figure 6:
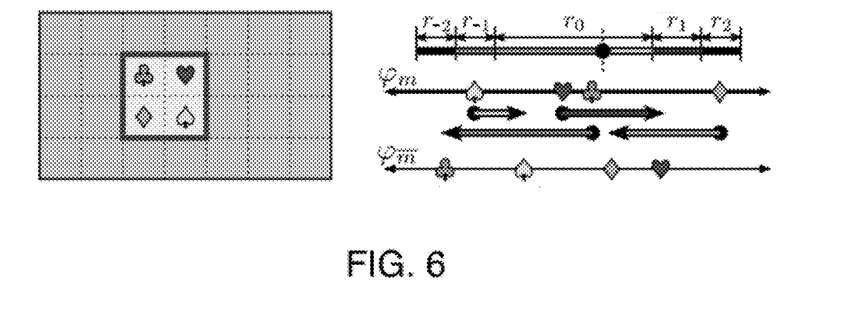
FIG. 6 is a schematic diagram of a mask over a level set function and corresponding ranges for an additive perturbation.

This expresses the extent of each range, which is no longer just the height of the level set function. A particular level set, called the perturbing level set $\phi_m$ is first selected as the one to perturb. A pixel i belongs to region $R_m$ if it has the maximal height among all level set functions (i.e., $\phi_m(i) \equiv \phi_m(i)$). For such a pixel i to change regions, at least as much height is subtracted as $\Delta_i(\phi_m, \phi_{max^2})$ (the difference between the perturbing level set and the second maximum height). For a pixel that currently does not belong to a region $R_m$ to change, at least as much height is added as $\Delta_i(\phi_{max}, \phi_m)$ (the difference between the maximum and the perturbing level set height). An example of the range endpoints is shown in FIG. 6 for an M-ary range description for M=2, with two non-null regions and one null region. A random mask is shown on the left, with pixel locations marked by the suit symbols: ♣ ☐ ♡ ♠. On the right, the height of each of the pixels is plotted on the real line for two level set functions, $\phi_m$ and $\phi_{\bar{m}}$. The possible ranges for the perturbing level set, $\phi_m$, are shown above these plots, where the dotted line is the zero-perturbation line.

BFPS allowed pixels to move from $R_0 \to R_m$ or $R_m \to R_0$. This representation allows pixels to move from $R_{max} \to R_m$ or $R_m \to R_{max^2}$, where $R_{max}$ and $R_{max^2}$ could potentially be any other region, not just $R_0$. For this reason, local extrema situations do not affect this representation.

This M-ary framework is also closely-related to the binary framework. In the binary case, perturbations to the level set function changed pixels so that they were either positive or negative valued. In the M-ary case, the perturbation to a particular level set changes pixels so that they are either the maximal value or not the maximal value. This M-ary framework simplifies to the binary framework if M=2, $\phi_2(i)=0$ $\forall i$, and the perturbing level set is always chosen to be $\phi_1$.

8 Topology-Based Constraints

The UHR approach can also be configured to use a topology-controlled sampler. The topology of a continuous, compact surface can be described by its genus (i.e., the number of "handles"). Digital topology is the discrete counterpart of continuous topology, where regions are represented based on binary variables on a grid.

In digital topology, connectiveness can be defined for the foreground (FG) and background (BG), describing how pixels in a local neighborhood are connected. For example, in 2D, a 4-connected region corresponds to a pixel being connected to its neighbors above, below, left, and right. An 8-connected region corresponds to being connected to the eight pixels in a 3×3 neighborhood. Connectiveness is jointly defined for the foreground (n) and background (17) to avoid topological paradoxes. Valid connectivities for 2D are (n, $\bar{n}$) ∈ {(4,8), (8,4)}.

Figure 7:
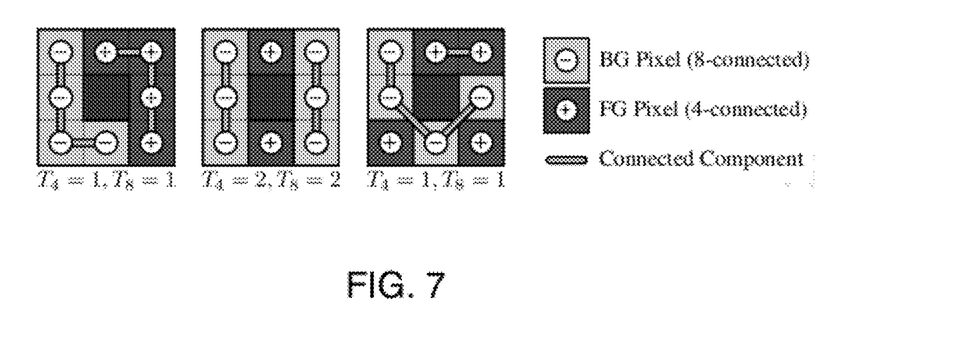
FIG. 7 is a schematic diagram of pixel neighborhoods and corresponding topological numbers.

Given a pair of connectiveness, the topological numbers at a particular pixel, $T_n$ (for the FG) and $T_{\bar{n}}$ (for the BG) count the number of connected components a pixel is connected to in a 3×3 neighborhood. FIG. 7 shows examples of neighborhoods with their corresponding topological numbers.

While these topological numbers reflect topological changes, they do not distinguish splitting or merging of regions from the creation or destruction of a handle. Two additional topological numbers, $T_n^+$ and $T_{\bar{n}}^+$, count the number of unique connected components a pixel is connected to over the entire image domain. $T_n^+$ and $T_{\bar{n}}^+$ depend on how pixels are connected outside of the 3×3 region and enable the system to distinguish all topological changes.

By labeling each connected component in the foreground and background, $T_n^+$ can be computed efficiently when a pixel is added to the foreground and $T_{\bar{n}}^+$ can be computed efficiently when a pixel is added to the background. In 3D, $T_{\bar{n}}^+$ may be calculated when adding a pixel to the foreground, which can be computationally expensive. This calculation is not always necessary in 2D.

Figure 8:
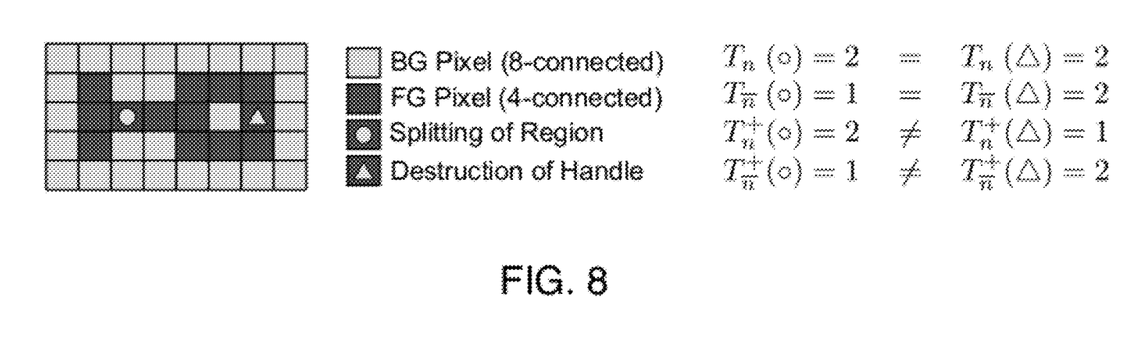
FIG. 8 is a schematic diagram of pixels in a perturbed segmentation with topological changes.

FIG. 8 shows an example of topological changes based on changes to the two pixels marked by ○ and ⊔, with corresponding topological numbers shown on the right side. Removing the ○ pixel from the foreground splits the region and removing the ⊔ pixel destroys a handle. In this 2D case, both $T_n^+(○) \neq T_n^+(\square)$ and $T_{\bar{n}}^+(\square)$.

In 3D, this is generally not the case because for the ⊔ pixel, the two background regions can be connected in another 2D slice of the volume.

Figure 9:
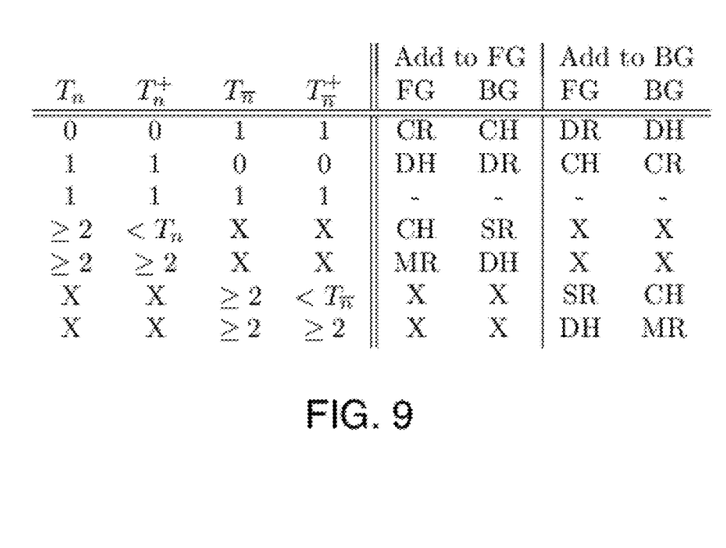
FIG. 9 is a table with examples of topological changes.

Furthermore, in 2D, the destruction of a handle in the foreground corresponds directly to a merging of regions in the background. Likewise, the splitting of regions in the foreground corresponds directly to a creation of a handle in the background. Because of this one-to-one mapping, the potentially expensive computation of $T_{\bar{n}}^+$ does not need to be performed when adding a pixel to the foreground. FIG. 9 shows a table that summarizes the topological changes of the foreground and background in 2D as a function of the four topological numbers. Topological changes are listed as a function of topological numbers. The following symbols are used: 'C'—Create; 'D'—Destroy; 'S'—Split; 'M'—Merge; 'H'—Handle(s); 'R'—Region(s); 'X'—any value; '—'—no topological change. Omitted configurations are impossible in 2D.

The following is an example of an approach for sampling from a space of segmentations while enforcing topology constraints. The approach is able to preserve detailed balance. While some implementations generates proposed samples using the UHR approach and reject samples that violate topology constraints, such implementations may waste significant computation generating samples that are rejected due to their topology. Some implementations only generate proposed samples from the set of allowable topological changes. The system is able to determine which ranges for a proposed perturbation correspond to allowable topologies and which do not. Ranges corresponding to restricted topologies have their likelihood set to zero in a topology-controlled version of the UHR approach (TC-UHR). The example presented here treats the topology constraint as a hard constraint. A distribution over topologies can be generated by weighting ranges based on topologies rather than eliminating restricted ones.

Similar to UHR, TC-UHR can also be configured make two passes to calculate the likelihoods of the ranges. Starting at $r_0$, the system either proceed in the positive or negative direction. Because $r_0$ corresponds to the range that does not change the sign of any pixels, $r_0$ will not correspond to a topological change. As the procedure iterates through the possible ranges, a list of pixels that violate a topological constraint is maintained. If this "violated list" is empty after a range is considered, then the range corresponds to an allowable topology. At each iteration, while any pixel in the violated list is allowed to change sign, it is removed and all neighboring pixels in the violated list are checked again as their topological constraint may have changed. In this process, for each range, the system maintains the labels of each connected component.

Implementations of the approaches described above can make use of software, hardware, or a combination of software and hardware. The software can include instructions for a data processing system tangibly embodied on a computer readable medium for causing the data processing system to perform the steps of the method described above. In some implementations, the data processing system is coupled to an image acquisition system (e.g., camera, electromagnetic sensor, medical imaging device, seismic data processing system etc.) and/or is coupled to an image presentation system (e.g., a computer monitor) displaying the segmentation, or information derived from the distribution of segmentations. In some implementations, the samples of the segmentations are further processed in a data processing system to compute data that represents aggregations (average, probabilistic expectation, etc.) based on such segmentations.

The approaches described herein can be extended in a variety of ways, to be applied in a variety of contexts. For example, the sampling approaches can be applied to a higher dimensional image, such as a 3-dimensional volume being sampled in a medical imaging context. A generalized N-dimensional representation can be used to sample from an N-dimensional clustering problem given a particular energy functional or loss function. Another extension includes incorporating temporal dynamics across samples. For example, 2-dimensional slices (e.g., of a 3-dimensional volume, or of a video sequence) can be represented with some prior distribution being used between samples of neighboring slices. The dependence between slices can be modeled using a Markov chain. For classification tasks, image features can be learned for segmenting an image conditioned on a surrogate energy functional, with training based on deep belief networks.

It is to be understood that the foregoing description is intended to illustrate and not to limit the scope of the invention, which is defined by the scope of the appended claims Other embodiments are within the scope of the following claims.

What is claimed is:

1. A computer-implemented method for sampling a distribution of segmentations of an image, the segmentations being based on a level set function, the method comprising, for each sample of the distribution:
for each of multiple iterations,
randomly selecting a set of locations of the level set function,
determining a domain of allowed perturbations of the level set function at the selected set of locations, and
randomly accepting a perturbation of the level set function according to a criterion corresponding to a biased distribution over the domain of allowed perturbations of the level set function, wherein the bias is selected to increase a probability of accepting the perturbation; and
determining said sample of the distribution of segmentations according to a perturbed level set function determined in a final iteration of the multiple iterations for said sample.

2. The method of claim 1, further comprising filtering perturbations at the selected set of locations to form the accepted perturbation of the level set function.

3. The method of claim 2, wherein the filtering comprises lowpass filtering.

4. The method of claim 1, wherein the bias is selected based at least in part on a gradient of a log of a probability density function corresponding to the distribution of segmentations.

5. The method of claim 1, wherein the bias is selected so that the probability of accepting the perturbation is unity.

6. The method of claim 1, wherein determining the domain of allowed peturbations and randomly accepting a perturbation further comprises:
identifying a plurality of ranges of allowed perturbations within the domain of allowed perturbations,
determining a probability distribution over the plurality of ranges,
randomly selecting a range from the plurality of ranges according to the determined probability distribution, and
perturbing the level set function with a perturbation selected from the selected range.

7. The method of claim 6, wherein each range is associated with a segmentation the image, and the probability distribution over the plurality of ranges is based on probabilities of the segmentations associated with the ranges.

8. The method of claim 7, wherein the probability distribution comprises different respective uniform probability levels over each range, and the probability level for a particular range is based on a probability of the segmentation associated with a perturbation in the particular range at the selected set of locations.

9. The method of claim 6, wherein the domain of allowed perturbations comprises perturbations of the level set function at pixels within a mask defining a subset of pixels in the image.

10. The method of claim 9, wherein, for at least some samples of the distribution of segmentations, randomly selecting a set of locations comprises randomly selecting an extent of the mask.

11. The method of claim 9, wherein the domain of allowed perturbations comprises different sizes of an additive perturbation of the level set function added to each of the pixels within the mask.

12. The method of claim 11, wherein the domain of allowed perturbations is parameterized by one or more parameters, and each range of perturbations is associated with a corresponding range of one or more of the parameters.

13. The method of claim 9, wherein boundaries of the plurality of ranges within the domain of allowed perturbations are determined according to pixel values of pixels within the mask.

14. The method of claim 13, wherein the segmentation based on the level set function assigns a segmentation label to each of at least some pixels in the image, and a transition from a first selected range to a second selected range corresponds to at least one pixel value changing its segmentation label.

15. The method of claim 6, wherein determining the probability distribution over the plurality of ranges comprises determining, for each range in the domain, a quantity that depends on a probability of a segmentation induced by perturbation of the level set function by a perturbation in said range.

16. The method of claim 1, wherein each segmentation includes more than two segments into which the image is segmented.

17. The method of claim 16, wherein each of multiple segments is determined based on a different respective level set function, and at least one segment corresponds to pixels not in any of the multiple segments.

18. The method of claim 1, wherein randomly selecting a range comprises randomly selecting a range according to one or more topological constrains of the corresponding segmentation.

19. The method of claim 18, wherein the one or more topological constraints include: excluding a range from being selected if the corresponding segmentation does not meet a predetermined topological property.

20. The method of claim 1, wherein each sample of the distribution is determined after multiple iterations of a Markov chain Monte Carlo sampling procedure.

21. A computer program, stored on a computer-readable storage medium, for sampling a distribution of segmentations of an image, the segmentations being based on a level set function, the computer program comprising instructions for causing a computer system to, for each sample of the distribution:
for each of multiple iterations,
randomly select a set of locations of the level set function,
determine a domain of allowed perturbations of the level set function at the selected set of locations, and
randomly accept a perturbation of the level set function according to a criterion corresponding to a biased distribution over the domain of allowed perturbations of the level set function, wherein the bias is selected to increase a probability of accepting the perturbation; and
determine said sample of the distribution of segmentations according to a perturbed level set function determined in a final iteration of the multiple iterations for said sample.

22. An apparatus, comprising:
a storage system storing an image received from an image source; and
a sampling module executing on at least one processor, coupled to the storage system, configured to sample a distribution of segmentations of the image, the segmentations being based on a level set function, the sampling including, for each sample of the distribution,
for each of multiple iterations,
randomly selecting a set of locations of the level set function,
determining a domain of allowed perturbations of the level set function at the selected set of locations, and
randomly accepting a perturbation of the level set function according to a criterion corresponding to a biased distribution over the domain of allowed perturbations of the level set function, wherein the bias is selected to increase a probability of accepting the perturbation; and
determining said sample of the distribution of segmentations according to a perturbed level set function determined in a final iteration of the multiple iterations for said sample.

* * * * *